(12) United States Patent
Kurth et al.

(10) Patent No.: US 11,026,266 B2
(45) Date of Patent: Jun. 1, 2021

(54) NB-IOT MULTI-CARRIER OPERATION IN UNLICENSED ISM BANDS

(71) Applicant: SHENZHEN GOODIX TECHNOLOGY CO., LTD., Shenzhen (CN)

(72) Inventors: Mathias Kurth, Dresden (DE); Martin Froehlich, Dresden (DE)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 11 days.

(21) Appl. No.: 16/523,981

(22) Filed: Jul. 26, 2019

(65) Prior Publication Data

US 2019/0357270 A1 Nov. 21, 2019

Related U.S. Application Data

(63) Continuation of application No. PCT/EP2018/052119, filed on Jan. 29, 2018.

(30) Foreign Application Priority Data

Jan. 30, 2017 (EP) .................................... 17153665

(51) Int. Cl.
*H04W 74/08* (2009.01)
*H04W 76/27* (2018.01)
(Continued)

(52) U.S. Cl.
CPC ......... *H04W 74/0833* (2013.01); *H04L 67/12* (2013.01); *H04W 72/042* (2013.01); *H04W 76/27* (2018.02)

(58) Field of Classification Search
CPC ............. H04W 74/0833; H04W 76/27; H04W 72/042; H04L 67/12
See application file for complete search history.

(56) References Cited

U.S. PATENT DOCUMENTS

2009/0010345 A1* 1/2009 Yang .................. H04K 1/10
2011/0110337 A1* 5/2011 Grant .................. H04W 72/04
(Continued)

FOREIGN PATENT DOCUMENTS

CN 105743631 A 7/2016

OTHER PUBLICATIONS

Huawei et al., "New Study Item proposal: Licensed-Downlink Assisted NB-IoT" 3GPP Draft; RP-162158, 3rd Generation Partnership Project (3GPP), Mobile Competence Centre; (Dec. 2016).
(Continued)

*Primary Examiner* — Ronald B Abelson
(74) *Attorney, Agent, or Firm* — J.C. Patents

(57) ABSTRACT

The disclosure discloses a method for a joint multi-carrier operation of narrowband Internet-of-Things (NB-IoT) in both licensed and unlicensed frequency spectrum. The object of the disclosure to provide a method that uses the existing technologies of multi-carrier operation, but can also handle and use ISM bands (unlicensed bands) and thereby all regulatory requirements are observed, will be solved by a method for a joint multi-carrier operation of narrowband Internet-of-Things (NB-IoT) in both licensed and unlicensed frequency spectrum by extending the existing NB-IoT regulations standard in licensed spectrum by additional uplink and/or downlink NB-IoT carriers operating in unlicensed spectrum, wherein additional data depending on a scheduled medium access procedure is added to configuration data, which is broadcasted between a base station and a UE for ensuring regulatory compliance during operation on both the UE and base station side.

16 Claims, 6 Drawing Sheets

(51) Int. Cl.
    *H04W 72/04*     (2009.01)
    *H04L 29/08*     (2006.01)

(56) References Cited

U.S. PATENT DOCUMENTS

| | | | |
|---|---|---|---|
| 2013/0237777 A1 | 9/2013 | Patel | |
| 2014/0206279 A1* | 7/2014 | Immendorf | H04K 3/00 |
| 2015/0365880 A1 | 12/2015 | Malladi et al. | |
| 2016/0095125 A1* | 3/2016 | Park | H04W 72/0486 |
| 2017/0134881 A1* | 5/2017 | Oh | H04W 4/005 |
| 2018/0027554 A1* | 1/2018 | Yerramalli | H04W 72/04 |
| 2018/0070243 A1* | 3/2018 | Liu | H04W 16/14 |
| 2018/0192442 A1* | 7/2018 | Li | H04W 74/08 |

OTHER PUBLICATIONS

Nokia Networks et al., "NB-IoT Operation in Multiple PRBs" 3GPP Draft; RP-160447; 3rd Generation Partnership Project (3GPP), Mobile Competence Centre; (Feb. 2016).
International Search Report of corresponding International application No. PCT/EP2018/052119, dated May 3, 2018.
The first Office Action of CN application No. 2018800093407.

\* cited by examiner

| DL Carrier (licensed) | DCI N0 | | DCI N0 | | DCI N0 | | DCI N0 | |
|---|---|---|---|---|---|---|---|---|
| UL Carrier (licensed) | | | not received | | | | | NPUSCH |
| UL Carrier (unlicensed) | | NPUSCH | | NPUSCH | | NPUSCH | | received |
| External Interference | | received | | | blocked | | | |

Fig. 6

| DL Carrier (licensed) | | USS | not received | | | | USS |
|---|---|---|---|---|---|---|---|
| DL Carrier (unlicensed) | USS | | USS | | USS | | USS |
| External Interference | | | | | blocked | blocked | |
| Radio Link Monitoring | | ☐ | | | | | ☐ |

Fig. 7

NB-IOT MULTI-CARRIER OPERATION IN UNLICENSED ISM BANDS

CROSS-REFERENCE TO RELATED APPLICATIONS

This application is a continuation of International Application No. PCT/EP2018/052119, filed on Jan. 29, 2018, which claims priority to European Patent Application No. 17153665.9, filed on Jan. 30, 2017, both of which are hereby incorporated by reference in their entireties.

TECHNICAL FIELD

The disclosure relates to a method for a joint multi-carrier operation of narrowband Internet-of-Things (NB-IoT) in both licensed and unlicensed frequency spectrum.

BACKGROUND

Narrowband Internet-of-Things (NB-IoT) is a recently ratified 3GPP standard for the radio interface between base station (eNodeB) and user equipment (UE) [Reference: 3GPP TS 23.720 Study on architecture enhancements for Cellular Internet of Things]. For the UE side, the benefits of NB-IoT are increased coverage, ultra-low power consumption and reduced device costs while maintaining the high security standards as well as the global roaming capabilities of cellular communication. For the network and the operator, on the other side, NB-IoT enables the support of a massive number of devices per cell and sector without additional investments in core network and radio access network equipment. Furthermore, NB-IoT supports the deployment within the radio frequency spectrum of a 3GPP Long Term Evolution (LTE) cell, so that no additional investments in radio spectrum are required in that case.

With the support of a massive number of devices, the network is at risk of overload when too many devices attempt to access the network at the same time. By the means of access barring, the network can overcome the overload situation by excluding certain access classes from network service for some time. The increased network access latency due to access barring is generally not a problem for machine to machine (M2M) communication with delay tolerant traffic, the access barring procedure additionally depletes the battery of the device. The usage of ISM spectrum (Industrial, Scientific and Medical Band) to mitigate the peaks in the network load would be an attractive option for network operators.

On the other hand, low power wireless wide area network (LPWAN) technologies like LoRaWAN, SigFox, and IEEE 802.11ah target the standalone deployment within unlicensed spectrum. These technologies neither interact with technologies in licensed radio frequency spectrum, nor do they offer a migration path towards licensed spectrum. By supporting a seamless interaction between unlicensed and licensed spectrum, the investment of the user can be protected in case the unlicensed spectrum gets overloaded.

The NB-IoT standard does not support the operation in unlicensed spectrum, e.g. industrial, scientific and medical (ISM) bands. The regulatory requirements associated with the usage of ISM and other unlicensed bands are diverse in terms of maximum transmission power, transmission bandwidth, duty cycles, modulation, medium access, etc., and they are fragmented within different geographical regions. Furthermore, the unlicensed spectrum has to be shared with other devices, and coexistence mechanisms have to be put in place.

SUMMARY

It is therefore the objective of the disclosure to provide a method that uses the existing technologies of multi-carrier operation, but can also handle and use ISM bands (unlicensed bands) and thereby all regulatory requirements are observed.

The objective will be solved by a method for a joint multi-carrier operation of narrowband Internet-of-Things (NB-IoT) in both licensed and unlicensed frequency spectrum by extending the existing NB-IoT standard Release 14 in licensed spectrum by additional uplink and/or downlink NB-IoT carriers operating in unlicensed spectrum, wherein additional data depending on a scheduled medium access procedure is added to configuration data, which is broadcasted between a base station and a UE for ensuring regulatory compliance during operation on both the UE and base station side.

Regulatory compliance means that the device operates in unlicensed radio frequency spectrum according to the regulatory requirements at apply in the region of operation. The International Telecommunication Union has defined the unlicensed ISM bands, but the regulatory requirements for the usage of ISM bands resides with regulatory bodies that are responsible for the considered region of the world. For the United States of America, for example, the Federal Communications Commission (FCC) is the regulatory authority. In Europe, the European Telecommunications Standards Institute (ETSI) is the responsible regulatory authority.

The solution allows to extend existing NB-IoT deployments in licensed spectrum by additional uplink (and optionally downlink) NB-IoT carriers operating in unlicensed spectrum using an enhanced version of the NB-IoT multi-carrier feature. Therefore, it is possible to ensure compliance to regulatory requirements of the unlicensed spectrum in uplink (UL) and downlink (DL) direction.

The proposed method enables the addition of NB-IoT carriers in unlicensed radio frequency (RF) spectrum for network access and unicast transmission. A unicast transmission is the exchange of data between a base station and a single device/UE. For network operators, the unlicensed spectrum is able to absorb load peaks in the network access and network traffic, so that more users and devices can be serviced without any additional investment in RF spectrum resources. On the other hand, services that are provided in the unlicensed spectrum will benefit from the proposed method in the following way. By using NB-IoT in the unlicensed spectrum, the existing security infrastructure of cellular communication can be used. The scheduled medium access of NB-IoT as well as the frequency reuse generally provides a higher spectral density, which reduces the radio time and prolongs the battery lifetime. Furthermore, it enables the seamless migration to and from licensed bands, in case the reliability and pricing preferences of the service changes over time. The service level provided can be switched without any hardware or software changes on the device side (UE).

In a preferred embodiment of the inventive method, the extended configuration data for a network access on an unlicensed carrier is broadcast within system information on a licensed carrier. The extended configuration data is understood as the configuration data extended by additional data.

It is known, that for the operation in unlicensed band, there are diverse regulatory compliance requirements regarding output transmission power, duty cycling, channel bandwidth, medium access, modulation, etc. that are generally region-dependent. For the European region, an overview is shown in table 1. In order to ensure regulatory compliance, all relevant configuration data shall be broadcast by the base station (eNodeB). The configuration is the necessary input to the medium access methods proposed below, which ensures the compliance during the operation on both device (UE) and base station (eNodeB) side.

TABLE 1

Frequency Bands for Non-Specific Short Range Devices in Europe (from [SWRA048]).

| Frequency Band | ERP | Duty Cycle | Channel Bandwidth | Remarks |
| --- | --- | --- | --- | --- |
| 433.05-434.79 MHz | +10 dBm | <10% | No limits | No audio and voice |
| 433.05-434.79 MHz | 0 dBm | No limits | No limits | ≤−13 dBm/10 kHz, no audio and voice |
| 433.05-434.79 MHz | +10 dBm | No limits | <25 kHz | No audio and voice |
| 868-868.6 MHz | +14 dBm | <1% | No limits | |
| 868.7-869.2 MHz | +14 dBm | <0.1% | No limits | |
| 869.3-869.4 MHz | +10 dBm | No limits | <25 kHz | Appropriate access protocol required |
| 869.4-869.65 MHz | +27 dBm | <10% | <25 kHz | Channels may be combined to one high speed channel |
| 869.7-870 MHz | +7 dBm | No limits | No limits | |
| 2400-2483.5 MHz | +7.85 dBm | No limits | No limits | Transmit power limit is 10-dBm EIRP |

The common configuration for network access on the unlicensed carrier is broadcast within the system information on the licensed carrier as shown exemplary in FIG. 1. The 3GPP Release 14 already introduces the necessary configuration for random access on another NB-IoT carrier (e.g. NPRACH resources, location of the NPDCCH common search space (CSS) type 2, etc.) as part of the NB-IoT multi-carrier feature. Extending the configuration data by the necessary additional data that are broadcast by the system information has the advantage that no hardware changes on the device side (UE) are necessary.

In a further preferred embodiment of the inventive method, the additional data comprise of duty cycle budget for UE and/or energy detection threshold information and/or allowed carrier frequencies in unlicensed spectrum and/or maximum transmission power and/or bandwidth for uplink transmissions and/or transmission power for downlink NB-IoT reference symbols.

For the operation in unlicensed spectrum the following configuration needs to be added: The supported medium access mode(s) has/have to be indicated, e.g. duty cycling and/or listen-before-talk (LBT) including the associated parameters, e.g. duty cycle budget per UE or energy detection threshold. It is also necessary to extend the configuration data by the allowed carrier frequencies to cover the unlicensed bands as well as the maximum transmission power and bandwidth for uplink transmissions. And the transmission power of downlink NB-IoT reference symbols, if available, shall be added as well.

The dedicated configuration is extended in the same way for the unicast operation on an unlicensed NB-IoT carrier after the connection establishment as discussed above (FIG. 1).

In an embodiment of the inventive method, information is stored in a universal subscriber identity module (USIM) of a UE if the UE is allowed to use licensed and/or unlicensed spectrum to access the network.

Whether a device (UE) is allowed to use the licensed and/or unlicensed spectrum to access, the network shall be contained in the subscription information stored on the Universal Subscriber Identity Module (USIM) of the UE. When the subscription has been changed, the information shall be updated over the air.

Independently of the supported medium access control (MAC) mode, e.g. duty cycling and/or listen-before-talk (LBT), the UE needs to estimate the Narrowband Reference Signal Received Power (NRSRP) and path loss on the unlicensed carrier in order to determine the coverage class as well as the initial preamble transmission power. The NRSRP estimate can be obtained from an RF band this frequency-wise nearby, e.g. band 20 or band 8 for the EU 868 MHz unlicensed and the 915 MHz ISM band. Otherwise, the base station might use its duty cycle budget within the unlicensed band to transmit the narrowband reference signal (NRS). The NRS transmission window length and period shall be broadcast within the system information.

In a further embodiment of the inventive method, the scheduled medium access procedure is based on duty cycling, whereas an uplink is performed in unlicensed spectrum according to a duty cycle and a duty cycle budget within a defined averaging window and a downlink is performed in licensed spectrum.

In the duty cycling access procedure the UE tries to contract the network in the unlicensed spectrum. The UE has to count when resources are free to make themselves known to the network. Once the network is aware of the UE, it is up to the network to tell the UE when the UE can send data and to manage the time resources which are available to the UE. It is the task of the network to set up a total balance of the transfer.

If using the duty cycling access procedure, only the uplink direction is transferred to the unlicensed carriers/bands, because the communication direction base station to UE has to be shared by a lot of UEs, and hence the restrictions to the data transfer for each UE would be too difficult, and would make no senses in most cases, if the DL is transferred to the unlicensed bands as well. For example, a typical UE device, e.g. a sensor generates one data item per hour or per day or generally per unit of time. In IoT applications the typical data stream is from the UE to the network, in order to send the data item in the network for further processing somewhere else. The other direction from base station to a UE is usually minimal. Therefore, if this uplink direction can be transferred to the unlicensed band, a clear relief can be achieved.

In a preferred embodiment of the inventive method, the duty cycle budget represents a transmission time within the defined averaging window, whereas the duty cycle budget is determined by regulatory authorities and communicated to the UE by the base station.

Certain unlicensed bands allow the uncoordinated medium access within a defined duty cycle. A duty cycle is understood as the time the device has been transmitting relative to the total observation time. The duty cycle budget applies to the transmitting device (UE), and it is measured over a defined averaging window. As an example, a duty cycle budget of 1% corresponds to for example 36 seconds of transmission time within one hour, which might be sufficient for many low traffic IoT applications that are periodically reporting a small amount of data. For the duty cycling medium access, all uplink transmissions are executed within unlicensed spectrum. The downlink remains in licensed spectrum since the base station has to support many UEs. Since the considered class of IoT applications is uplink centric, the impact on the licensed operation remains limited.

In another preferred embodiment of the inventive method, the UE starts a random-access procedure to the network if more resources are available than data have to be sent by the UE. This means that sufficient duty cycle budget must be available in the remaining duty cycle and hence the UE should prevent itself from running out of resources but still having data to send.

Both UE and eNodeB track the UE uplink transmission time to ensure the duty cycle budget at the UE. The UE is allowed to start the random-access procedure only if there is sufficient budget available in the remaining duty cycle. Sufficient budget means the UE is expected to deliver all pending data of the current session with the remaining transmission time within the current duty cycle. Similarly, the eNodeB schedules uplink transmissions only if the duty cycle of the UE allows. Otherwise, the eNodeB shall release or suspend the network connection. In order to account for preamble retransmissions in the budget at the eNodeB, the UE shall report the number of attempts to the network. If an NPUSCH format 1 or 2 could not be received, the eNodeB shall nevertheless update the remaining duty cycle budget of the UE accordingly. A preamble transmission is the initial self-initiated transmission of the UE in order to access to the NB-IoT radio access network.

In another embodiment of the inventive method, the scheduled medium access procedure is based on listen-before-talk (LBT), whereas both the uplink and optionally the downlink are scheduled in unlicensed spectrum.

In case the duty cycle limitations are not sufficient for an IoT application, the device might use listen-before-talk (LBT) for medium access in several unlicensed bands. Listen-before-talk is a procedure, where the UEs check the transmission channel, if it is free or used by another party. For example, the reporting of an exceptional event might have higher traffic requirements. The LBT mode can be used on both UL and DL side, whereas the DL side is optional. Another use case is the temporary offloading of devices from licensed to unlicensed carriers in order to accommodate more active devices during network load peaks.

The LBT procedure shall ensure a fair coexistence between NB-IoT and other users of the unlicensed spectrum. The LBT procedure introduced into LTE for licensed assisted access (LAA) [Reference: RP-161803 Introduction of eLAA (UL Channel Access Procedure) in 36.213] shall be reused for NB-IoT in unlicensed spectrum. Within the DL and UL medium access, the centralized scheduling of the eNodeB might be blocked due to external interference that is triggering the LBT procedure.

The blocking of individual physical channels shall be handled as follows: In an embodiment of the inventive method, uplink transmissions on narrowband physical uplink shared channel (NPUSCH) are scheduled by the base station, whereas the UE processes the LBT procedure within a defined NPUSCH LBT window on frequency resources assigned by the base station in order to prevent any blocking due to other UEs scheduled simultaneously on different sub-carriers. A sub-carrier according to the NB-IoT standard is a frequency spectrum resource of 15 kHz, which is the smallest scheduling unit in terms of frequency spectrum.

And in another embodiment of the inventive method, the defined NPUSCH LBT window and/or an additional synchronization sequence, which is prepended to the NPUSCH for the base station to detect the start of the uplink transmission, are configured within the system information.

The uplink transmissions on NPUSCH (both format 1 and 2) are scheduled by the eNodeB. When the NPUSCH is due, the UE shall process the LBT, in addition. The LBT shall be processed on the frequency resources assigned within the uplink grant only in order to prevent any blocking due to other UEs scheduled simultaneously on different sub-carriers. If the LBT succeeds immediately or within a defined time window (the so-called NPUSCH LBT window), the UE starts the NPUSCH transmission, otherwise it remains silent. The NPUSCH transmission is started immediately after the LBT success. An additional synchronization sequence is prepended to the NPUSCH for the base station to detect the start of the uplink transmission. Both the NPUSCH LBT window and the NPUSCH synchronization sequence length are configured to the UE via system information (for random access message 3) and dedicated signaling (for other transmissions). The Dedicated Configuration sends the base station only in message 4 during random access. For the random access message 3, only system information is available. The exemplary overall procedure is shown in FIG. 5.

In a further embodiment of the inventive method, downlink transmissions on narrowband physical downlink control channel (NPDCCH) are blocked until the LBT procedure has succeeded, whereas concurrently narrowband physical downlink shared channel (NPDSCH) is reserved via the associated NPDCCH for cross-carrier scheduling.

If the NPDCCH is initially blocked, but sufficient NPDCCH candidates remain, the eNodeB might decide to start the NPDCCH later after the LBT has succeeded. The network might decide to schedule more NPDCCH repetitions to account for the initial blocking. The UE shall consider the potential blocking (missing NRS) during the channel estimation. In contrast, the NPDSCH cannot be started later. Instead, the channel needs to be reserved beforehand, either via the associated NPDCCH or otherwise for cross-carrier scheduling. Optionally, the eNodeB might start the LBT earlier to reserve the channel in advance and, thus, increase the probability to start the downlink transmission on time.

In another further preferred embodiment of the inventive method, a dynamic scheduling of licensed and unlicensed NB-IoT carriers is performed by extending the downlink control information (DCI) for unicast uplink and downlink by one bit to indicate the transmission on the licensed or unlicensed NB-IoT carrier.

The interference situation within the unlicensed band might vary vastly on short time-scales. When another device is blocking the spectrum for several seconds, then the connection between UE and eNodeB would be temporarily out of service. This issue can be addressed by using reliable NPDCCH monitoring as described below and dynamic scheduling of licensed and unlicensed NB-IoT carriers on a per grant basis. For that purpose, the downlink control information (DCI) for unicast uplink and downlink is extended by one bit to indicate the transmission on the licensed or unlicensed carrier similar to cross-carrier scheduling in LTE. Using this approach, a UE can be moved from licensed to unlicensed spectrum within the MAC (medium access control) scheduling.

Therefore, in a further preferred embodiment of the inventive method, the NPDCCH is simultaneously monitored in both unlicensed and licensed spectrum, whereas a user specific search space (USS) configured via dedicated configuration in the system information is used by the UE.

With a NPDCCH allocated in unlicensed spectrum only, the connection to the base station might be blocked by external interference resulting in a connection error. To ensure reliable physical layer control signaling, the simultaneous monitoring of NPDCCH in both unlicensed and licensed spectrum is proposed. For both common search space (CSS) type 2 as well as user specific search space (USS), the UE shall monitor the unlicensed NB-IoT carrier, if configured, as well as the anchor carrier in licensed spectrum. The monitoring period for each of them is configured via system information (CSS type 2) and via dedicate configuration (USS). This way, the UE can be reached via licensed spectrum even if the NPDCCH in unlicensed spectrum is blocked.

Within the USS, the presence of NRS during the NPDCCH transmission in unlicensed spectrum cannot be ensured. Thus, the radio link shall be monitored for radio link failure on the anchor carrier within the licensed band, where the presence of NRS can be ensured.

In the uplink of a NB-IoT cell, multiple UEs can be scheduled using orthogonal resources in the frequency domain. If the UE would process the LBT within the full 180 kHz system bandwidth, it will get blocked by the transmission of other UEs having started the transmission earlier. In other words, the LBT procedure would sequentialize the uplink transmission of the UEs. To achieve the multi-point uplink transmission also in unlicensed spectrum, each UE shall listen only on the frequency resources assigned to it using the LBT procedure described above. Hence, in a preferred embodiment of the inventive method, the UE listens only on frequency resources assigned to said UE by using the LBT procedure. This has the advantage that not the full bandwidth is blocked by a UE or has to be considered by a UE.

And in another preferred embodiment of the inventive method, the UE process LBT on all narrowband physical random access channel (NPRACH) frequencies resources using frequency hopping to achieve multiplexing of multiple UEs, whereas the UEs attempt to send a preamble until the processing of the LBT procedure is successful; otherwise the UE skips a NPRACH occasion and continues with a next NPRACH occasion.

Frequency-hopping is a method of transmitting radio signals by rapidly switching a carrier among many frequency channels, using a pseudorandom sequence known to both, transmitter and receiver, hence base station and/or UE. It is used as a multiple access method in the code division multiple access (CDMA) scheme frequency-hopping code division multiple access (FH-CDMA). FHSS is a wireless technology that spreads its signal over rapidly changing frequencies. Each available frequency band is divided into sub-frequencies. Signals rapidly change ("hop") among these in a pre-determined order. Interference at a specific frequency will only affect the signal during that short interval. FHSS can, however cause interference with adjacent direct-sequence spread spectrum (DSSS) systems. If frequency hopping is used for NPRACH within the associated NPRACH frequency resources, the UE needs to process LBT on all NPRACH frequency resources. To achieve the multiplexing of multiple UEs within an NPRACH occasion, it is proposed to start with an attempt to send the preamble using timing advance (TA) 0 by the UE. Before the UE can access the medium, hence the channel or frequency carrier, the UE has to process the LBT procedure. If the LBT procedure is successful, the UE can send the preamble. If the LBT procedure is not successful, the UE shall skip the NPRACH occasion and continue with the next NPRACH occasion. If the medium got busy during performing the LBT procedure, the UE shall determine the associated time when the medium got busy in terms of timing advance. Timing advance is the time difference between the downlink signal timing sent from the base station relative to the uplink signal timing sent by the UE. Then it should attempt to send the preamble using the estimated timing advance and proceed with the LBT procedure. This algorithm tries to align the start timing of the preamble according to the earliest observed NPRACH transmission as indicated by the LBT procedure. This way, it is ensured that eventually all UEs will be able to transmit the preamble.

Furthermore, the number of NPRACH sub-carriers shall allow the configuration of 6 sub-carriers of 3.75 kHz in order to comply with the channel bandwidth constraint of 25 kHz.

The disclosure will be explained in more detail using exemplary embodiments.

BRIEF DESCRIPTION OF DRAWINGS

The appended drawings show

FIG. 6 Cross-Carrier Scheduling of NPUSCH;

FIG. 7 Robust physical layer control signaling via monitoring NPDCCH in both unlicensed and licensed bands;

DESCRIPTION OF EMBODIMENTS

Figure 1:
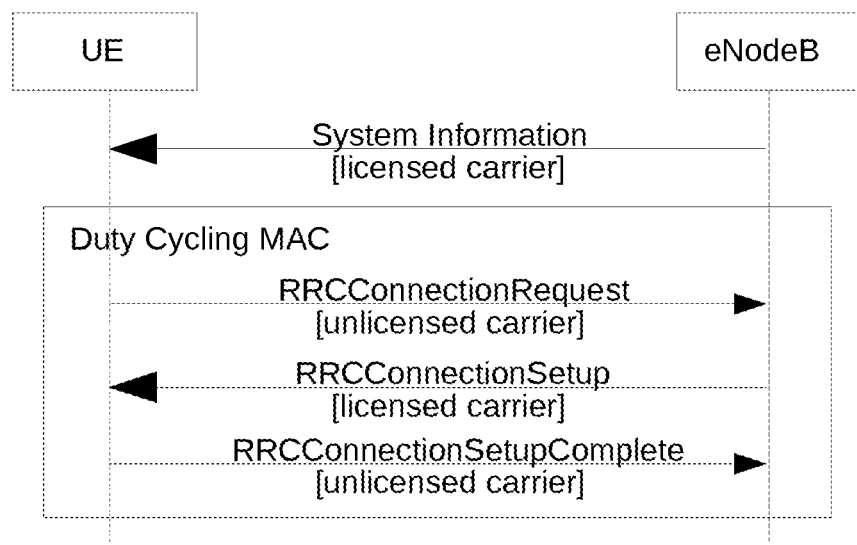
FIG. 1 System Information Broadcast including the parameters of the unlicensed carrier and network access using duty cycling MAC.

FIG. 1 shows a common initialization between a network, hence a base station, and user equipment (UE). In a first step the base station (eNodeB) broadcasts system information on a licensed carrier, whereas the system information includes the configuration data which are extended by additional information meaning that a network access can be performed on an unlicensed carrier. In order to use unlicensed carrier for transmission configuration data need to be added for the operation in unlicensed spectrum with the following information: An information which medium access control (MAC) modes are supported, duty cycling and/or listen-before-talk (LBT) as well as associated parameters, e.g. duty cycle budget per UE or energy detection threshold. Furthermore, the allowed carrier frequencies need to be extended to cover the unlicensed bands and the maximum transmission power and bandwidth for uplink transmissions need to be registered. If available, it is necessary to add the transmission power of downlink NB-IoT reference symbols. If the initialization is completed and the duty cycling medium access control mode is used, the UE sends an RRCConnectionRequest on an unlicensed carrier in order to mitigate the peaks in the network load. Using duty cycling the downlink is always performed on a licensed carrier, because the base station has to support many UEs. An RRCConnectionSetupComplete message is transmitted to the base station on the unlicensed carrier to complete the data exchange.

Figure 2:
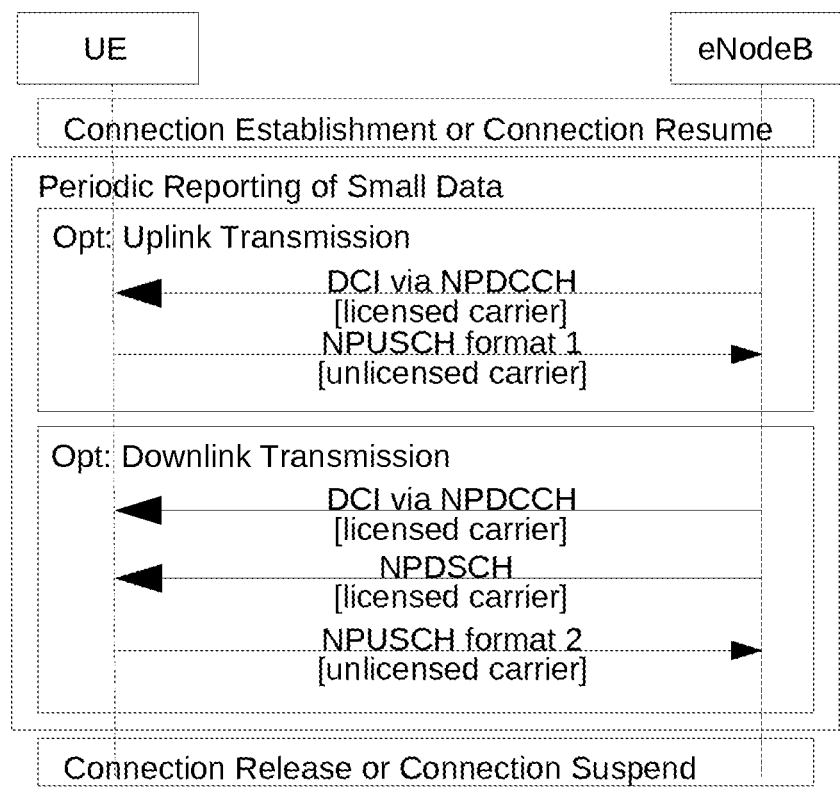
FIG. 2 Use case periodic reporting of small data with uplink transmissions take place in the unlicensed spectrum using the duty cycling MAC.

FIG. 2 shows a use case by periodic reporting of small data. The uplink transmissions take place in the unlicensed spectrum using the duty cycling medium access control (MAC). As described for FIG. 1, the connection establishment is already completed or has been resumed. After the connection of the UE with the base station has been established, the UE can periodically report small amounts of data. In the uplink direction the base station transmit the downlink control information (DCI) via the narrowband physical downlink control channel (NPDCCH) on a licensed carrier, whereas the DCI includes information, on which unlicensed carrier the UE can transmit its data. Such information can also already be determined and exchanged in the system information. The UE, which has informed the eNodeB to be configured or be able to transmit also on unlicensed carriers, transmit its user data on the narrowband physical uplink shared channel (NPUSCH) format 1 on the provided unlicensed carrier. In the uplink direction the eNodeB/network is responsible to provide resources to the UE, in order to allow the UE to transmit data. In the downlink direction the base station transmits the downlink control information (DCI) via the narrowband physical downlink control channel (NPDCCH) on a licensed carrier, whereas the DCI includes information, on which unlicensed carrier the UE can transmit its data. Concurrently the base station sends user data on the narrowband physical downlink shared channel (NPDSCH) for the UE on a licensed carrier, whereas the UE sends a "hand-shake" information on the narrowband physical uplink shared channel (NPUSCH) format 2 on the provided unlicensed carrier. In the uplink direction the eNodeB/network is responsible to provide resources to the UE, in order to allow the UE to transmit data.

For both, base station side and UE side, if duty cycling MAC is used, both UE and eNodeB track the UE uplink transmission time to ensure the duty cycle budget at the UE. The UE is allowed to start the random-access procedure only if there is sufficient budget available in the remaining duty cycle. Sufficient budget means the UE is expected to deliver all pending data of the current session with the remaining transmission time within the current duty cycle. Therefore, the UE has to compare the remaining budget against the expected budget usage. Similarly, the eNodeB schedules uplink transmissions only if the duty cycle of the UE allows. Otherwise, the eNodeB shall release or suspend the network connection. In order to account for preamble retransmissions in the budget at the eNodeB, the UE shall report the number of attempts to the network. If an NPUSCH format 1 or 2 could not be received, the eNodeB shall nevertheless update the remaining duty cycle budget of the UE accordingly.

Figure 3:
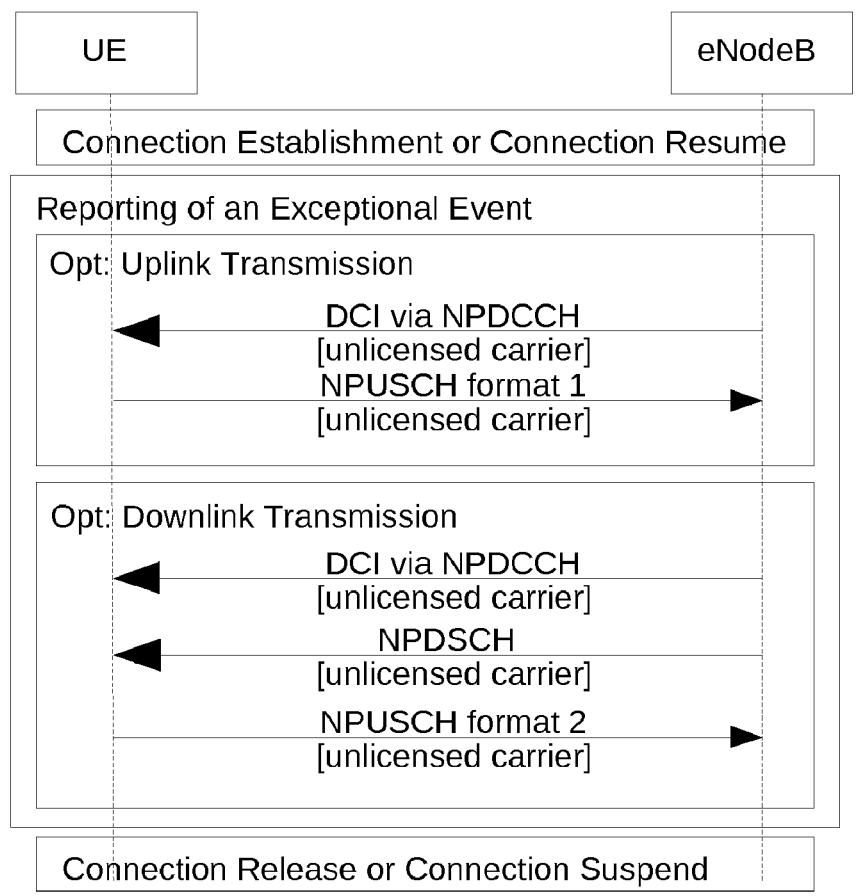
FIG. 3 Use case exceptional reporting: Both UL and DL transmissions are using the unlicensed band using the listen-before-talk MAC.

In case the duty cycle limitations are not sufficient for an IoT application, then the device might use listen-before-talk (LBT) for medium access in several unlicensed bands. For example, the reporting of an exceptional event might have higher traffic requirements. The LBT mode can be used on both UL and DL side as shown in FIG. 3. FIG. 3 shows a use case reporting an exceptional event. The uplink as well as the downlink transmissions can take place in the unlicensed spectrum using the listen-before-talk (LBT) medium access control (MAC). As described for FIG. 1, the connection establishment is already completed or has been resumed. After the connection of the UE with the base station has been established, the UE can report exceptional events by performing the LBT protocol and if the LBT has been succeeded the data can be exchanged. In the uplink direction the base station transmit the downlink control information (DCI) via the narrowband physical downlink control channel (NPDCCH) on an unlicensed carrier, whereas the DCI includes information, on which unlicensed carrier the UE can transmit its data. The UE, which has informed the eNodeB to be configured or able to transmit also on unlicensed carrier, transmit its user data on the narrowband physical uplink shared channel (NPUSCH) format 1 on the provided unlicensed carrier. In the downlink direction the base station transmits the downlink control information (DCI) via the narrowband physical downlink control channel (NPDCCH) on an unlicensed carrier, whereas the DCI includes information, on which unlicensed carrier the UE can transmit its data. Concurrently the base station sends user data on the narrowband physical downlink shared channel (NPDSCH) for the UE on an unlicensed carrier, whereas the UE sends a "hand-shake" information on the narrowband physical uplink shared channel (NPUSCH) format 2 on the provided unlicensed carrier.

Figure 4:
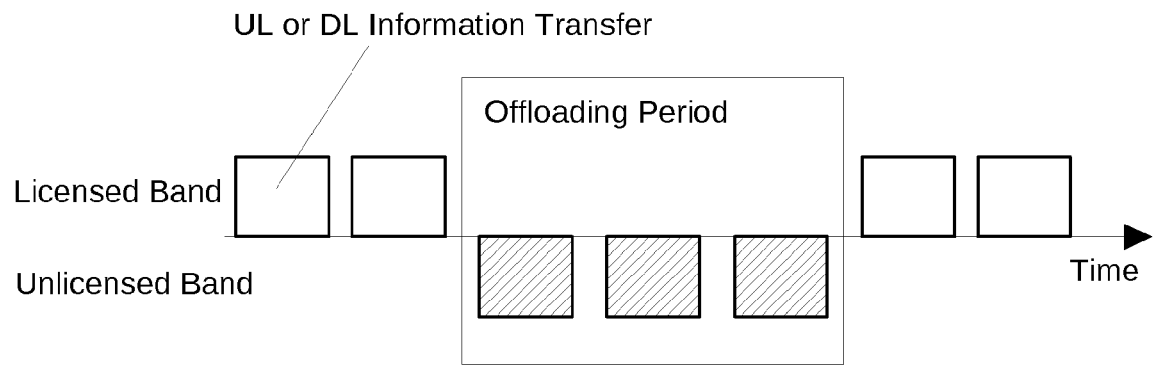
FIG. 4 Use case offloading of devices into unlicensed bands during network load peaks.

Another use case is shown in FIG. 4. During network load peaks it is possible to offload devices (UEs) into unlicensed bands. If there is a temporary offloading of devices in a licensed band, devices can be redirect from licensed to unlicensed bands in order to accommodate more active devices during network load peaks.

Figure 5:
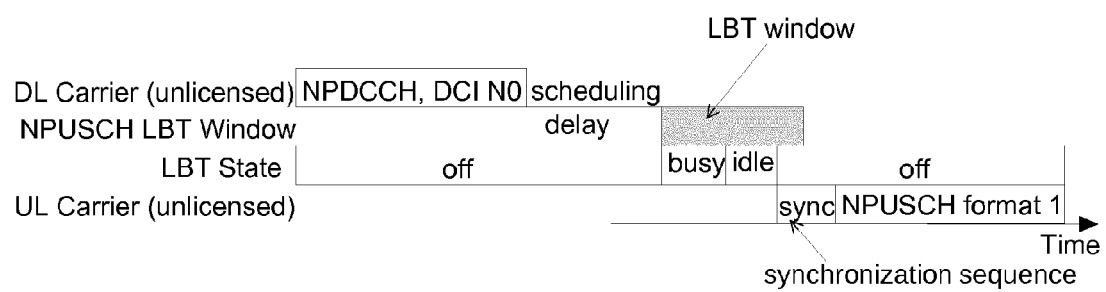
FIG. 5 Listen-before-talk and synchronization signal transmission during NPUSCH processing in LBT MAC mode.

FIG. 5 shows the listen-before-talk procedure and synchronization signal transmission during a narrowband physical uplink shared channel (NPUSCH) processing in LBT MAC mode. The uplink transmissions on NPUSCH (both format 1 and 2) are scheduled by the eNodeB. When the NPUSCH is due, the UE shall process the LBT, in addition. The LBT shall be processed on the frequency resources assigned within the uplink grant only in order to prevent any blocking due to other UEs scheduled simultaneously on different sub-carriers. If the LBT succeeds immediately or within a defined time window (the so-called NPUSCH LBT window), the UE starts the NPUSCH transmission, otherwise it remains silent. The NPUSCH transmission is started immediately after the LBT success. An additional synchronization sequence (sync) is prepended to the NPUSCH for the base station to detect the start of the uplink transmission. Both, the NPUSCH LBT window and the NPUSCH synchronization sequence length are configured to the UE via system information (for random access message 3) and dedicated signaling (for other transmissions). The overall procedure is shown in FIG. 5.

FIG. 6 shows a cross-carrier scheduling of narrowband physical uplink shared channel (NPUSCH). When the unlicensed carrier gets blocked by external interference, the NPUSCH can be moved to licensed spectrum within the MAC scheduling. The interference situation within the unlicensed band might vary vastly on short time-scales. When another device is blocking the spectrum for several seconds, then the connection between UE and eNodeB would be temporarily out of service. It is proposed to use reliable NPDCCH monitoring by dynamic scheduling of licensed and unlicensed NB-IoT carriers on a per grant basis. For that purpose, the downlink control information (DCI) for unicast uplink and downlink is extended by one bit to indicate the transmission on the licensed or unlicensed carrier similar to cross-carrier scheduling in LTE. Using this approach, a UE can be moved from licensed to unlicensed spectrum within the MAC scheduling as shown in FIG. 6.

FIG. 7 shows a robust physical layer control signaling via monitoring the narrowband physical downlink control channel (NPDCCH) in both unlicensed and licensed bands. The radio link monitoring is conducted on the licensed band only. Radio link monitoring ensured that the UE detects a broken radio link and that the UE recovers from that situation. The radio link monitoring is used only in licensed spectrum. The rationale is that it cannot be ensured that the radio link monitoring is reliable in unlicensed spectrum due to arbitrary interference. With a NPDCCH allocated in unlicensed spectrum only, the connection to the base station might be blocked by external interference resulting in a connection error. To ensure reliable physical layer control signaling, it is proposed to simultaneously monitoring of NPDCCH in both unlicensed and licensed spectrum as shown in FIG. 7. For both common search space (CSS) type 2 as well as user specific search space (USS), the UE shall monitor the unlicensed NB-IoT carrier, if configured, as well as the anchor carrier in licensed spectrum. The monitoring period for each of them is configured via system information (CSS type 2) and dedicate configuration (USS). This way, the UE can be reached via licensed spectrum even if the NPDCCH in unlicensed spectrum is blocked.

Within the USS, the presence of NRS during the NPDCCH transmission in unlicensed spectrum cannot be ensured. Thus, the radio link shall be monitored for radio link failure on the anchor carrier within the licensed band, where the presence of NRS can be ensured.

In another embodiment it is proposed to establish an intra-cell interference mitigation for NB-IoT uplink transmissions. In the uplink of an NB-IoT cell, multiple UEs can be scheduled using orthogonal resources in the frequency domain. If the UE would process the LBT within the full 180 kHz system bandwidth, it will get blocked by the transmission of other UEs having started the transmission earlier. In other words, the LBT procedure would sequentialize the uplink transmission of the UEs. To achieve the multi-point uplink transmission also in unlicensed spectrum, each UE shall listen only on the frequency resources assigned to it using the LBT procedure described above.

Figure 8:
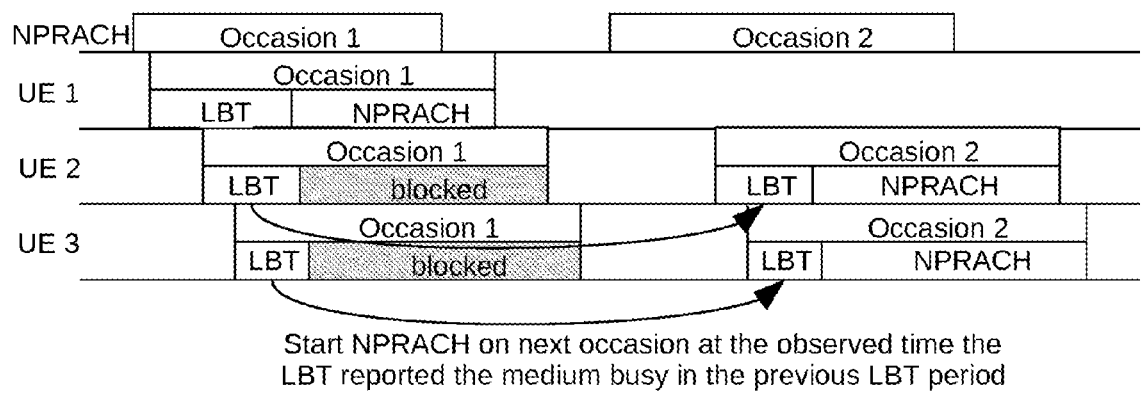
FIG. 8 Scenario where three UEs attempt to connect to the radio access network using the inventive method.

FIG. 8 shows a scenario where three UEs attempt to connect to the radio access network by sending an NPRACH on NPRACH occasion 1. The NPRACH occasion is defined in terms of the base station downlink timing. Due to the propagation delay of radio frequency signals, the NPRACH occasions are not time aligned at the considered UEs. Instead, UE 1 is assumed to be closest to the base station, so that UE 1 observes the NPRACH occasion first. Similarly, UE 2 observes the NPRACH occasion before UE 3 due to a lower propagation delay. On the observed start of the NPRACH occasion, each UE starts the LBT procedure. UE 1 finishes the LBT procedure first and starts the NPRACH transmission towards the base station. The NPRACH transmission from UE 1 blocks the medium access for the UEs 2 and 3, since they will observe the medium busy. They abort the medium access within NPRACH occasion 1 and attempt to access the medium again in the following NPRACH occasion 2. Since the LBT procedure has not been successful in the previous NPRACH attempt, both UE 2 and 3 will now attempt to send the NPRACH at the time the medium got busy within the previous NPRACH attempt in NPRACH occasion 1, after having processed LBT within NPRACH occasion 2. The benefit of the proposed procedure is that it time-aligns UEs that are attempting to send NPRACH, so that multiple access becomes possible even with LBT usage for NPRACH.

What is claimed is:

1. A method for a joint multi-carrier operation of narrowband Internet-of-Things (NB-IoT) in both licensed and unlicensed frequency spectrum by extending the existing NB-IoT standard Release 14 in licensed spectrum by additional uplink and/or downlink NB-IoT carriers operating in unlicensed spectrum, wherein additional data depending on a supported medium access control (MAC) mode is added to configuration data, which is broadcasted by a base station for ensuring regulatory compliance during operation on both the UE and base station side, wherein the supported MAC mode is listen-before-talk (LBT), whereas both the uplink and optionally the downlink are scheduled in unlicensed spectrum, wherein uplink transmissions on narrowband physical uplink shared channel (NPUSCH) are scheduled by the base station, whereas the UE processes the LBT procedure within a defined NPUSCH LBT window on frequency resources assigned by the base station in order to prevent any blocking due to other UEs scheduled simultaneously on different sub-carriers, wherein the defined NPUSCH LBT window and/or an additional synchronization sequence, which is prepended to the NPUSCH for the base station to detect the start of the uplink transmission are configured within system information.

2. The method for a joint multi-carrier operation of NB-IoT according to claim 1, wherein the extended configuration data for a network access on an unlicensed carrier is broadcast within system information on a licensed carrier.

3. The method for a joint multi-carrier operation of NB-IoT according to claim 1, wherein the additional data comprise of duty cycle budget for a UE and/or energy detection threshold information and/or allowed carrier frequencies in unlicensed spectrum and/or maximum transmission power and/or bandwidth for uplink transmissions and/or transmission power for downlink NB-IoT reference symbols.

4. The method for a joint multi-carrier operation of NB-IoT according to claim 1, wherein an information is stored in a universal subscriber identity module (USIM) of a UE if the UE is allowed to use licensed and/or unlicensed spectrum to access the network.

5. The method for a joint multi-carrier operation of NB-IoT according to claim 1, wherein the supported MAC mode is duty cycling, whereas an uplink is performed in unlicensed spectrum according to a duty cycle and a duty cycle budget within a defined averaging window and a downlink is performed in licensed spectrum.

6. The method for a joint multi-carrier operation of NB-IoT according to claim 5, wherein the duty cycle budget represents a transmission time within the defined averaging window, whereas the duty cycle budget is determined by regulatory authorities and communicated to the UE by the base station.

7. The method for a joint multi-carrier operation of NB-IoT according to claim 1, wherein the UE starts a random-access procedure to the network if more resources are available than data have to be sent by the UE.

8. The method for a joint multi-carrier operation of NB-IoT according to claim 1, wherein downlink transmissions on narrowband physical downlink control channel (NPDCCH) are blocked until the LBT procedure has succeeded, whereas concurrently narrowband physical downlink shared channel (NPDSCH) is reserved via the associated NPDCCH for cross-carrier scheduling.

9. The method for a joint multi-carrier operation of NB-IoT according to claim 1, wherein a dynamic scheduling of licensed and unlicensed NB-IoT carriers is performed by extending the downlink control information (DCI) for unicast uplink and downlink by one bit to indicate the transmission on the licensed or unlicensed NB-IoT carrier.

10. The method for a joint multi-carrier operation of NB-IoT according to claim 8, wherein the NPDCCH is simultaneously monitored in both unlicensed and licensed spectrum, whereas a user specific search space (USS) configured via dedicated configuration in the system information is used by the UE.

11. The method for a joint multi-carrier operation of NB-IoT according to claim 1, wherein the UE listens only on frequency resources assigned to said UE by using the LBT procedure.

12. The method for a joint multi-carrier operation of NB-IoT according to claim 1, wherein the UE process LBT on all narrowband physical random access channel (NPRACH) frequencies resources using frequency hopping by attempting to send a preamble until the processing of the LBT procedure is successful, otherwise the UE skips the NPRACH occasion and continues with a next occasion.

13. A method for a joint multi-carrier operation of narrowband Internet-of-Things (NB-IoT) in both licensed and unlicensed frequency spectrum by extending the existing NB-IoT standard Release 14 in licensed spectrum by additional uplink and/or downlink NB-IoT carriers operating in unlicensed spectrum, wherein additional data depending on a supported medium access control (MAC) mode is added to configuration data, which is broadcasted by a base station for ensuring regulatory compliance during operation on both the UE and base station side,
 wherein the supported MAC mode is duty cycling, whereas an uplink is performed in unlicensed spectrum according to a duty cycle and a duty cycle budget within a defined averaging window and a downlink is performed in licensed spectrum.

14. The method for a joint multi-carrier operation of NB-IoT according to claim 13, wherein the duty cycle budget represents a transmission time within the defined averaging window, whereas the duty cycle budget is determined by regulatory authorities and communicated to the UE by the base station.

15. A method for a joint multi-carrier operation of narrowband Internet-of-Things (NB-IoT) in both licensed and unlicensed frequency spectrum by extending the existing NB-IoT standard Release 14 in licensed spectrum by additional uplink and/or downlink NB-IoT carriers operating in unlicensed spectrum, wherein additional data depending on a supported medium access control (MAC) mode is added to configuration data, which is broadcasted by a base station for ensuring regulatory compliance during operation on both the UE and base station side,
 wherein the supported MAC mode is listen-before-talk (LBT), whereas both the uplink and optionally the downlink are scheduled in unlicensed spectrum,
 wherein downlink transmissions on narrowband physical downlink control channel (NPDCCH) are blocked until the LBT procedure has succeeded, whereas concurrently narrowband physical downlink shared channel (NPDSCH) is reserved via the associated NPDCCH for cross-carrier scheduling.

16. The method for a joint multi-carrier operation of NB-IoT according to claim 15, wherein the NPDCCH is simultaneously monitored in both unlicensed and licensed spectrum, whereas a user specific search space (USS) configured via dedicated configuration in the system information is used by the UE.

* * * * *